US012625643B2

(12) United States Patent
Lee et al.

(10) Patent No.:  US 12,625,643 B2
(45) Date of Patent:       May 12, 2026

(54) SAMPLING-BASED READ ENABLING WINDOW GENERATION METHOD

(71) Applicant: NVIDIA Corporation, Santa Clara, CA (US)

(72) Inventors: Jiwang Lee, San Jose, CA (US); Jaewon Lee, San Jose, CA (US); Po-Chien Chiang, Hsinchu (TW); Hsuche Nee, Zhubei (TW); Wen-Hung Lo, Saratoga, CA (US); Michael I. Halfen, San Francisco, CA (US); Abhishek Dhir, Oakville (CA); Zhonghua Li, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 69 days.

(21) Appl. No.: 18/805,782

(22) Filed: Aug. 15, 2024

(65) Prior Publication Data

US 2026/0050393 A1      Feb. 19, 2026

(51) Int. Cl.
G06F 3/06                (2006.01)
(52) U.S. Cl.
CPC .......... G06F 3/0655 (2013.01); G06F 3/0625 (2013.01); G06F 3/0673 (2013.01)
(58) Field of Classification Search
CPC ..... G06F 3/0655; G06F 3/0625; G06F 3/0673
See application file for complete search history.

(56) References Cited

U.S. PATENT DOCUMENTS

| | | | | |
|---|---|---|---|---|
| 2016/0239220 A1* | 8/2016 | Yu | .......................... | G06F 3/0611 |
| 2021/0255796 A1* | 8/2021 | Takano | ................. | G06F 3/0659 |
| 2022/0229599 A1* | 7/2022 | Jo | .......................... | G06F 3/0659 |
| 2022/0365708 A1* | 11/2022 | Zhang | ................... | G06F 3/0673 |
| 2023/0342050 A1* | 10/2023 | Um | ........................ | G06F 3/0611 |
| 2024/0086087 A1* | 3/2024 | Cheng | ................... | G06F 3/0625 |

* cited by examiner

*Primary Examiner* — Zhuo H Li
(74) *Attorney, Agent, or Firm* — Leydig, Voit & Mayer, Ltd.

(57)                ABSTRACT

Systems and methods are herein disclosed that relate to generating read enabling windows in a multi-rank memory system that includes a memory controller connected to a plurality of memory ranks via a shared physical channel. The systems and methods disclosed herein provide for opening and closing read enabling windows for a memory controller in response to processing of data strobe signals output by a memory rank connected to the memory controller. By processing of the data strobe signals, a preamble can be detected that precedes a data transmission from a memory rank to the memory controller and a post-amble that follows the data transmission can also be detected. Detection of the preamble triggers opening of the read enabling window, and detection of the post-amble triggers closing of the read enabling window.

18 Claims, 13 Drawing Sheets

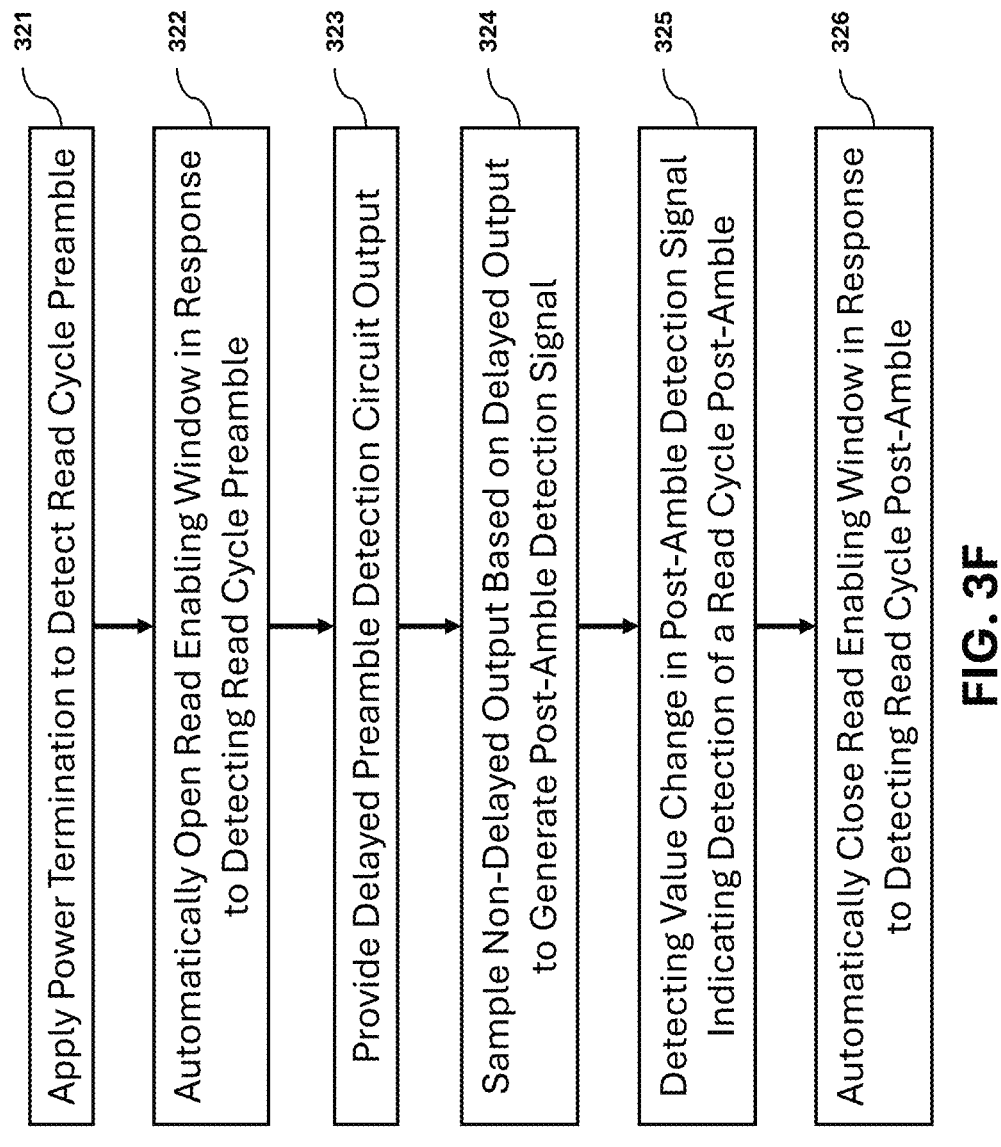

321 — Apply Power Termination to Detect Read Cycle Preamble

322 — Automatically Open Read Enabling Window in Response to Detecting Read Cycle Preamble 323 — Provide Delayed Preamble Detection Circuit Output 324 — Sample Non-Delayed Output Based on Delayed Output to Generate Post-Amble Detection Signal 325 — Detecting Value Change in Post-Amble Detection Signal Indicating Detection of a Read Cycle Post-Amble 326 — Automatically Close Read Enabling Window in Response to Detecting Read Cycle Post-Amble

FIG. 3F

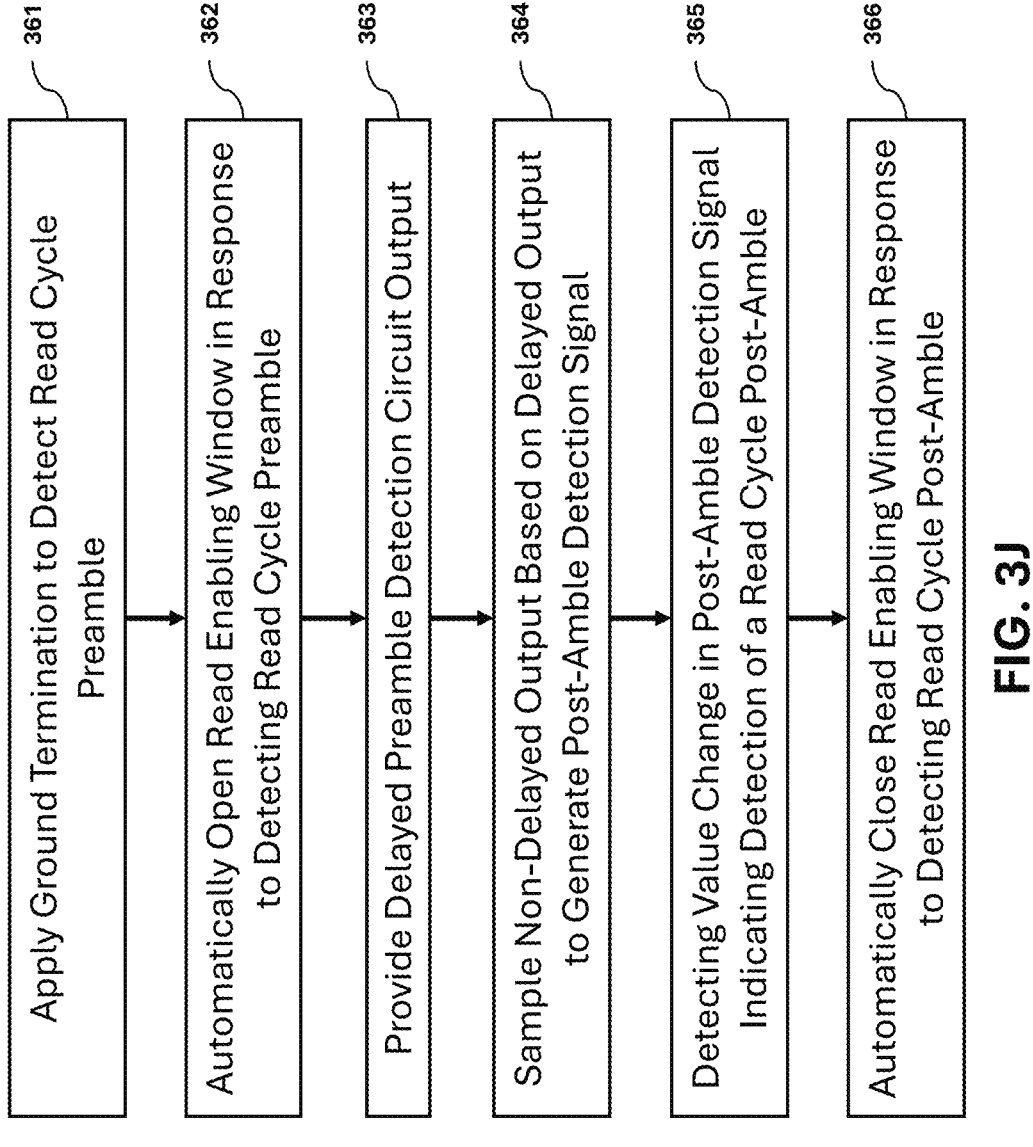

361 Apply Ground Termination to Detect Read Cycle Preamble

362 Automatically Open Read Enabling Window in Response to Detecting Read Cycle Preamble 363 Provide Delayed Preamble Detection Circuit Output 364 Sample Non-Delayed Output Based on Delayed Output to Generate Post-Amble Detection Signal 365 Detecting Value Change in Post-Amble Detection Signal Indicating Detection of a Read Cycle Post-Amble 366 Automatically Close Read Enabling Window in Response to Detecting Read Cycle Post-Amble

FIG. 3J

SAMPLING-BASED READ ENABLING WINDOW GENERATION METHOD

BACKGROUND

Multi-rank memory systems utilize multiple ranks of memory modules (i.e. multiple memory dies or groups of dies) to improve performance and capacity. Multi-rank memory systems include a memory controller connected to the multiple ranks of memory modules through a shared physical channel. Multi-rank memory systems offer, when compared to single-rank systems, improved performance due to parallelism and reduced contention. With multiple ranks, the memory controller can access different ranks independently. Therefore, when one rank is busy refreshing or performing internal operations, the controller can access another rank. This helps in hiding latency, thereby improving overall throughput, and also reduces contention for memory access, thereby leading to better performance in multi-threaded applications or workloads. Furthermore, multi-rank configurations enable more efficient use of the memory bus because the controller can switch between ranks to maximize data transfer rates and minimize idle periods.

However, limits on the ability to rapidly switch from one rank to another represent limits on the improved performance that can be achieved via the use of multi-rank memory systems. In read operation, for example, the memory controller issues a command to a particular rank, and the rank transmits a data signal (DQ) along with a strobe signal (DQS) synchronized with the data after a pre-defined number of clock cycles (corresponding to the read latency of the rank). However, due to variation between memory dies and physical channel configurations, there exists some variation in the actual timing with which a memory rank transmits the data and strobe signals in response to the read command. As a result of such variation, the memory controller must either (i) provide a larger time gap between read enabling windows (i.e. periods during which an internal gate on the memory controller side is open for the reception of data from a rank) or (ii) perform training of the window timing (i.e. tune the read enabling windows to the memory ranks). However, both options represent time loss from the system point of view, thereby limiting performance improvements. Such time loss can be particularly severe if periodic re-training is required to cover voltage/temperature variation.

SUMMARY

Embodiments of the present disclosure relate to systems and methods for self-generating read enabling windows for a memory controller in multi-rank memory systems.

According to an embodiment, a read-enabling window generation module for a memory controller of a multi-rank memory system is provided. The read-enabling window generation module is configured to trigger the generation of a read enabling window. The read-enabling window generation module includes processing circuitry configured to (i) detect, from a data strobe signal received from a respective memory rank of the multi-rank memory system, a read cycle preamble that precedes a transmission of data from the respective memory rank to the memory controller during a read cycle, (ii) output, in response to detecting the read cycle preamble, a trigger for opening the read enabling window, (iii) detect, from the data strobe signal received from the respective memory rank, a read cycle post-amble that follows the transmission of data from the respective memory rank to the memory controller during the read cycle, and (iv) output, in response to detecting the read cycle post-amble, a trigger for closing the read enabling window.

According to an embodiment, a memory controller for a multi-rank memory system is provided. The memory controller includes a read-enabling window generation module configured to trigger the generation of a read enabling window. The read-enabling window generation module includes processing circuitry configured to (i) detect, from a data strobe signal received from a respective memory rank of the multi-rank memory system, a read cycle preamble that precedes a transmission of data from the respective memory rank to the memory controller during a read cycle, (ii) output, in response to detecting the read cycle preamble, a trigger for opening the read enabling window, (iii) detect, from the data strobe signal received from the respective memory rank, a read cycle post-amble that follows the transmission of data from the respective memory rank to the memory controller during the read cycle, and (iv) output, in response to detecting the read cycle post-amble, a trigger for closing the read enabling window.

According to an embodiment, a multi-rank memory system is provided. The multi-rank memory system includes a memory controller comprising a read-enabling window generation module configured to trigger the generation of a read enabling window, a plurality of memory ranks, and a shared physical channel connecting the memory controller to the plurality of memory ranks. The read-enabling window generation module includes processing circuitry configured to (i) detect, from a data strobe signal received from a respective memory rank of the multi-rank memory system, a read cycle preamble that precedes a transmission of data from the respective memory rank to the memory controller during a read cycle, (ii) output, in response to detecting the read cycle preamble, a trigger for opening the read enabling window, (iii) detect, from the data strobe signal received from the respective memory rank, a read cycle post-amble that follows the transmission of data from the respective memory rank to the memory controller during the read cycle, and (iv) output, in response to detecting the read cycle post-amble, a trigger for closing the read enabling window.

According to an embodiment, a method is provided for self-generating a read enabling window of a memory controller for a multi-rank memory system. The method includes (i) receiving a data strobe signal from a respective memory rank of the multi-rank memory system, (ii) detecting, from the data strobe signal, a read cycle preamble that precedes a transmission of data from the respective memory rank to the memory controller during a read cycle, (iii) opening, in response to detecting the read cycle preamble, the read enabling window, (iv) detecting, from the data strobe signal, a read cycle post-amble that follows the transmission of data from the respective memory rank to the memory controller during the read cycle, and (v) closing, in response to detecting the read cycle post-amble, the read enabling window.

BRIEF DESCRIPTION OF THE DRAWINGS

Present systems and methods for self-generating read enabling windows for a memory controller in multi-rank memory systems are described in detail below with reference to the attached drawing figures, wherein:

FIG. 3F is a process flow diagram illustrating a method for self-generating a read-enabling window for a memory controller for a dual data rate (DDR) multi-rank memory system;

FIG. 3J is a process flow diagram illustrating a method for self-generating a read-enabling window for a memory controller for a low-power dual data rate (LPDDR) multi-rank memory system;

DETAILED DESCRIPTION

Figure 1:
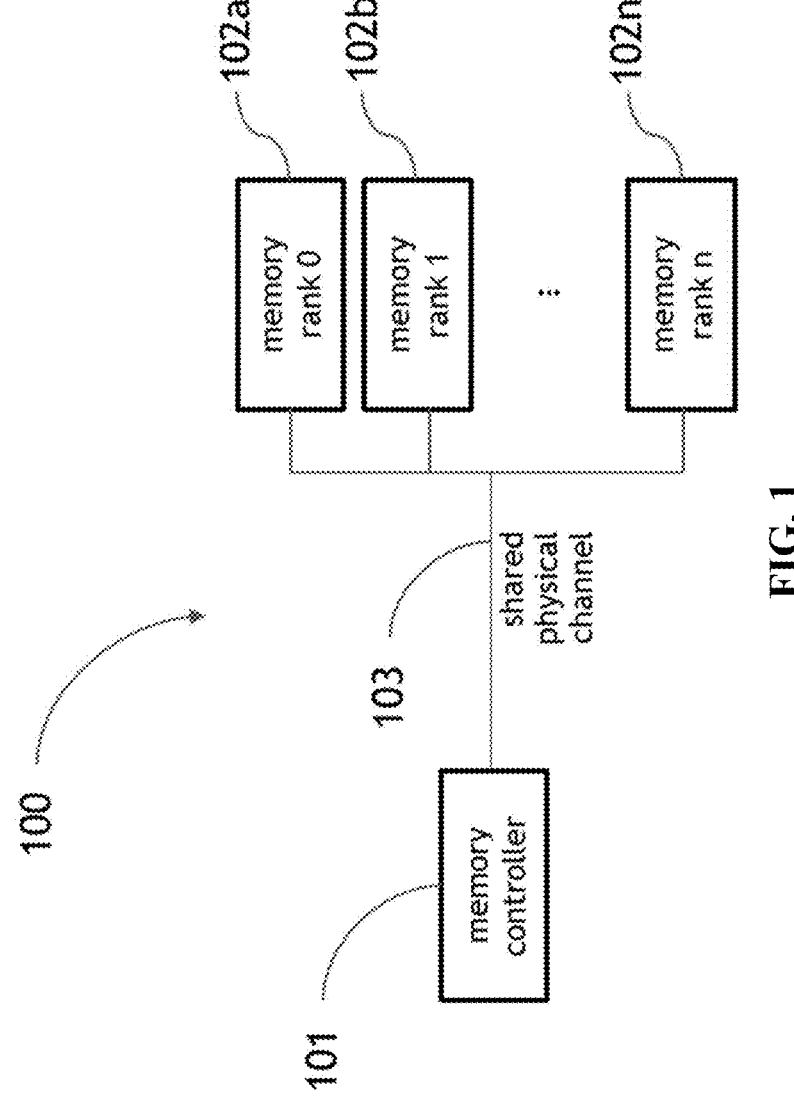
FIG. 1 illustrates a block diagram of a multi-rank memory system.

Systems and methods are herein disclosed that relate to generating read enabling windows in a multi-rank memory system which includes a memory controller connected to a plurality of memory ranks via a shared physical channel. Specifically, systems and methods are disclosed herein that provide for opening and closing read enabling windows of a memory controller in response to processing of signals, i.e. data strobe signals, output by a memory rank of the plurality of memory ranks connected to the memory controller. By processing of the data strobe signals, the systems and methods disclosed herein are able to detect a preamble that precedes a data transmission from a memory rank to the memory controller as well as a post-amble that follows the data transmission. Detection of the preamble can be used by the systems and methods disclosed herein to open the read enabling window, and detection of the post-amble can be used to close the read enabling window. This is in contrast to prior art techniques for generating read enabling windows, in which the memory controller opens and closes read-enabling windows based on pre-determined timing relative to the read commands.

By opening and closing read-enabling windows in response to the processing of data strobe signals output by a memory rank of a multi-rank memory system, the systems and methods disclosed herein provide a significant advantage relative to prior art systems. Specifically, the systems and methods disclosed herein can reduce the read-to-read timing during rank switching (i.e. the timing between a period when the memory controller reads from a first memory rank to a period when the memory controller reads from a second memory rank). Furthermore, the systems and methods disclosed herein can automatically adjust the read-to-read timing in a variable manner to account for timing variation of different ranks and to additionally account for timing variation resulting from process, voltage, and temperature (PVT) variation—and do so without training the memory controller to account for such variations. In this manner, the systems and methods disclosed herein can minimize the internal margin of circuitry switching without performing training/re-training.

According to a first aspect, the present disclosure provides a read-enabling window generation module for a memory controller of a multi-rank memory system. The read-enabling window generation module is configured to trigger the generation of a read enabling window based on the results of processing a signal, e.g. a data strobe signal, output by a memory rank of the multi-rank memory system. The read-enabling window generation module is configured to trigger the opening of the read enabling window in response to detecting a preamble carried by a data strobe signal and is configured to trigger the closing of the read enabling window in response to detecting a post-amble carried by the data strobe signal.

In an embodiment of the read-enabling window generation module according to the first aspect, the read-enabling window generation module includes processing circuitry configured to detect, from a data strobe signal received from a respective memory rank of the multi-rank memory system, a read cycle preamble that precedes a transmission of data from the respective memory rank to the memory controller during a read cycle. The processing circuitry is further configured to output, in response to detecting the read cycle preamble, a trigger for opening the read enabling window. The processing circuitry is additionally configured to detect, from the data strobe signal received from the respective memory rank, a read cycle post-amble that follows the transmission of data from the respective memory rank to the memory controller during the read cycle. The processing circuitry is also configured to output, in response to detecting the read cycle post-amble, a trigger for closing the read enabling window.

In embodiments of the read-enabling window generation module according to the first aspect, the processing circuitry can include a preamble detection circuit. The preamble detection circuit can include an input configured to receive the data strobe signal from the respective memory rank via a shared physical channel that connects a plurality of memory ranks of the multi-rank memory system to the memory controller. In addition, the preamble detection circuit can include a termination, the termination being a power termination or a ground termination. Furthermore, the preamble detection circuit can include a comparator circuit. The comparator circuit can be configured to process the data strobe signal received via the power termination or the ground termination and a reference signal. The comparator can be further configured to provide, at an output of the preamble detection circuit, a result of one or more operations for detecting the read cycle preamble. In such embodiments, the termination can be an on-die termination of the memory controller.

In embodiments of the read-enabling window generation module according to the first aspect, the processing circuitry can include a logic circuit configured to provide, as output, a result of one or more logical operations configured to detect the read cycle post-amble.

In embodiments of the read-enabling window generation module according to the first aspect, the processing circuitry includes a first flip flop. The first flip-flop includes a clock input and an output, and can additionally include an input and a reset. The clock input of the first flip-flop can be connected to an output of the preamble detection circuit. The output of the first flip-flop can be configured to output the trigger for opening the read enabling window in response to the output of the preamble detection circuit indicating that the read cycle preamble has been detected. The output of the first flip-flop can be further configured to output the trigger for closing the read enabling window in response to the output of the logic circuit indicating that the read cycle post-amble has been detected.

In embodiments of the read-enabling window generation module according to the first aspect, the processing circuitry further includes a second flip flop. The second flip-flop includes an input connected to the output of the preamble detection circuit, a clock input connected, via a delay, to the output of the preamble detection circuit, and an output. In such embodiments, the logic circuit includes a first input connected to the output of the second flip flop, a second input connected, via a delay, to the output of the second flip flop, and an output connected to a reset of the first flip flop.

In embodiments of the read-enabling window generation module according to the first aspect, the multi-rank memory system is a dual data rate (DDR) memory system, the data strobe signal is a differential data strobe signal comprising a true component and a complement component, the termination is a power termination, and the comparator circuit of the preamble detection circuit includes a comparator configured to compare a value of the true component to a value of the reference signal.

In embodiments of the read-enabling window generation module according to the first aspect, the multi-rank memory system is a low-power dual data rate (LPDDR) memory system, the data strobe signal is a differential data strobe signal comprising a true component and a complement component, the termination is a ground termination, and the comparator circuit of the preamble detection circuit includes a comparator configured to compare a value of the complement component to a value of the reference signal.

According to a second aspect, the present disclosure provides a memory controller for a multi-rank memory system. The memory controller includes a read-enabling window generation module according to the first aspect. Any embodiment of a read-enabling window generation module according to the first aspect can be utilized in embodiments of the memory controller according to the second aspect.

According to a third aspect, the present disclosure provides a multi-rank memory system. The multi-rank memory system includes a memory controller that includes a read-enabling window generation module according to the first aspect, a plurality of memory ranks, and a shared physical channel connecting the memory controller to the plurality of memory ranks. Any embodiment of a read-enabling window generation module according to the first aspect can be utilized in embodiments of the multi-rank memory system according to the third aspect.

According to a fourth aspect, the present disclosure provides a method for self-generating a read-enabling window of a memory controller for a multi-rank memory system. The method self-generates a read enabling window based on the results of processing a signal, e.g. a data strobe signal, output by a memory rank of the multi-rank memory system. The method opens the read enabling window in response to detecting a preamble carried by a data strobe signal and closes the read enabling window in response to detecting a post-amble carried by the data strobe signal.

In an embodiment of the method according to the fourth aspect, the method includes receiving a data strobe signal from a respective memory rank of the multi-rank memory system, detecting, from the data strobe signal, a read cycle preamble that precedes a transmission of data from the respective memory rank to the memory controller during a read cycle, and opening, in response to detecting the read cycle preamble, the read enabling window. The method further includes detecting, from the data strobe signal, a read cycle post-amble that follows the transmission of data from the respective memory rank to the memory controller during the read cycle, and closing, in response to detecting the read cycle post-amble, the read enabling window.

In embodiments of the method according to the fourth aspect, the detecting the read cycle preamble can include providing the data strobe signal to a preamble detection circuit configured to detect the read cycle preamble. In such embodiments, the preamble detection circuit can be configured to utilize a termination to receive the data strobe signal, wherein the termination is a power termination or a ground termination. In such embodiments, the preamble detection circuit can be configured to perform, via a comparator circuit, one or more operations configured to detect the read cycle preamble.

In embodiments of the method according to the fourth aspect, the detecting the read cycle post-amble can include performing, via a logic circuit, a logical operation configured to detect the read cycle post-amble.

In embodiments of the method according to the fourth aspect, the multi-rank memory system is a dual data rate (DDR) memory system, the data strobe signal is a differential data strobe signal comprising a true component and a complement component, the preamble detection circuit is configured to utilize the power termination to receive the data strobe signal, and the comparator circuit includes a comparator configured to compare the true component received via the termination to a reference signal.

In embodiments of the method according to the fourth aspect, the multi-rank memory system is a low power dual data rate (LPDDR) memory system, the data strobe signal is a differential data strobe signal comprising a true component and a complement component, the preamble detection circuit is configured to utilize the ground termination to receive the data strobe signal, and the comparator circuit includes a comparator configured to compare the complement component received via the termination to a reference signal.

In embodiments of the method according to the fourth aspect, the opening, in response to detecting the read cycle preamble, the read enabling window is performed in response to a trigger, output by a first flip-flop, and the closing, in response to detecting the read cycle post-amble, the read enabling window is performed in response to a trigger, output by the first flip flop. In such embodiments, the first flip-flop includes a clock input connected to an output of the preamble detection circuit, a reset connected to an output of a logic circuit configured to perform a logical operation configured to detect the read cycle post-amble, and an output configured to output the trigger for opening the read-enabling window and to output the trigger for closing the read-enabling window.

The read-enabling window generation module for a memory controller of a multi-rank memory system according to the first aspect, the memory controller according to the second aspect, and the multi-rank memory system according to the third aspect, and various embodiments thereof, can be configured to carry out the method according to the fourth aspect and various embodiments thereof.

FIG. 1 illustrates a generic block diagram of a multi-rank memory system. The multi-rank memory system 100 includes a memory controller 101, a plurality of memory ranks 102*a* through 102*n*, and a shared physical channel 103 that connects the memory controller to each respective memory rank of the plurality of memory ranks (i.e. 102*a*, 102*b*, . . . , 102*n*).

Figures 2A, 2B:
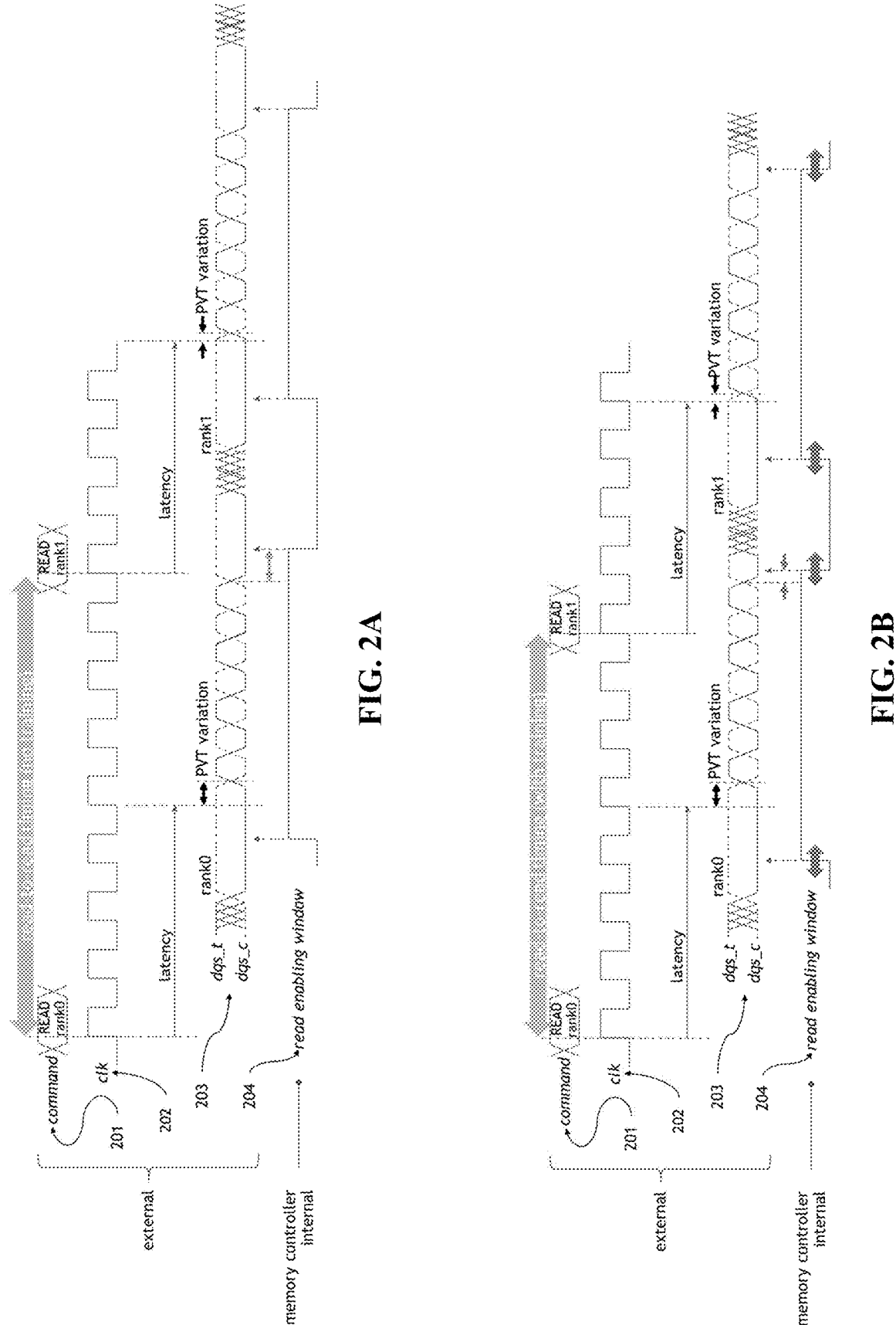
FIGS. 2A and 2B illustrate read-to-read timing for prior art techniques for rank switching in multi-rank memory systems.

FIGS. 2A and 2B illustrate read-to-read timing for prior art techniques for rank switching in a multi-rank memory system. FIG. 2A illustrates the timing between signals both internal and external to a memory controller (such as the memory controller 101) of a multi-rank memory system (such as the multi-rank memory system 100) for a memory controller that is not configured to train read enabling window timing for specific memory ranks, while FIG. 2B illustrates the timing between signals both internal and external to a memory controller of a multi-rank memory system for a memory controller that is configured to train read enabling window timing for specific memory ranks.

In FIG. 2A, the external signals include command signals 201 (i.e. a READ command) sent to a first memory rank (i.e. rank0, e.g. memory rank 102*a* of FIG. 1) and a second memory rank (i.e. rank1, e.g., memory rank 102*b* of FIG. 1) via a shared physical channel (e.g. shared physical channel 103), a clock signal 202 (i.e. clk) sent by the memory controller, and a data strobe signal 203 (i.e. a differential data strobe signal including a true component dqs_t and a complement component dqs_c). The internal signals include a read enabling window signal 204. In FIG. 2A, the timing of the read enabling window signal 204 is determined by the memory controller so as to be delayed from the READ command by a pre-defined number of clock cycles corresponding to the read latency of the rank. Due to variation between memory dies of memory ranks and in physical channel configurations, a relatively large time gap between consecutive read enabling windows—and between consecutive READ commands—is necessary to ensure that the read enabling window is open at the same time that data transmissions are made by the memory ranks.

In FIG. 2B, in contrast to FIG. 2A, a smaller time gap between consecutive read enabling windows—and between consecutive READ commands—can be provided due to training the memory controller to predict the latency of specific memory ranks, e.g. due to PVT variations. The same reference numerals used in FIG. 2A are used to refer to the same external and internal signals. Although training can reduce the read-to-read timing during rank switching (as illustrated in the comparison of FIGS. 2A and 2B), the training process itself represents time loss and thereby degrades the overall performance of the multi-rank memory system. During training, the memory controller receives known data from the memory ranks and adjusts its internal timing to ensure that the known data is properly recognized. Therefore, the training process occupies the channel (e.g. the shared physical channel 103) that connects the memory controller to the multiple memory ranks, and data transmission in support of non-training processes cannot be made during training. As a result, the overall performance of the system is degraded. Furthermore, periodic retraining can be required due to large temperature changes of the multi-rank memory system, as occur during intensive use or as a result of environmental changes. The training process can also violate the timing requirements for real-time operating systems (RTOSes) for computing applications that process data and events that have critically defined time constraints, e.g. as are utilized in autonomous vehicles. As a result, multi-rank memory systems cannot implement training processes and simultaneously remain viable for a variety of applications.

In order to limit the detrimental impacts on performance of the training process, an additional memory buffer can be provided to pre-fetch data from the memory that will be required by non-training processes during the training process. However, such a memory buffer occupies physical space on a chip, thereby increasing costs and limiting space available for other components. In addition, utilization of such a buffer requires additional software support, complicating the programming required to take advantage of the benefits provided by the multi-rank memory system.

Figures 3A, 3C, 3D:
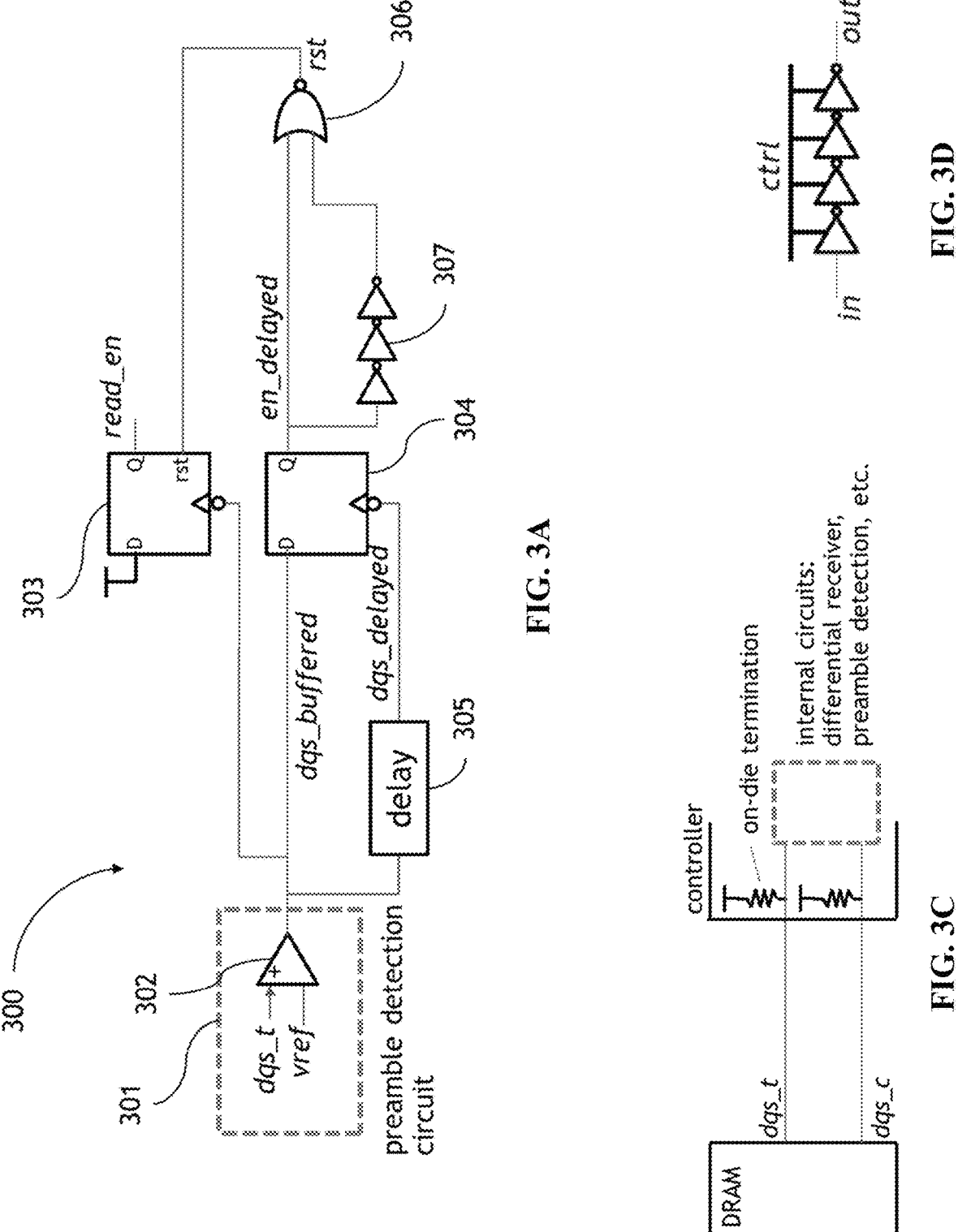
FIG. 3A illustrates a read-enabling window generation module for a dual data rate (DDR) multi-rank memory system.
FIG. 3C illustrates a power termination interface suitable for use in a preamble detection circuit of the read-enabling window generation module of FIG. 3A.
FIG. 3D illustrates a voltage controlled delay line suitable for use in the read-enabling window generation module of FIG. 3A.
Figure 3B:
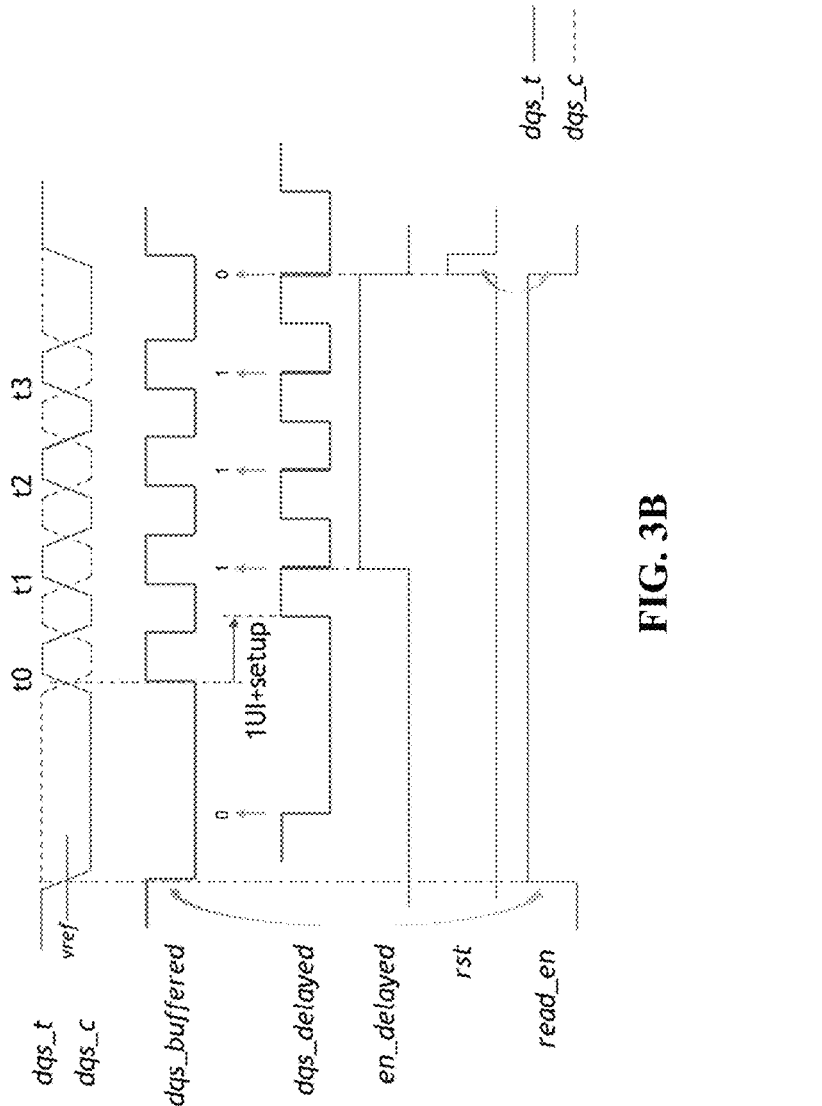
FIG. 3B illustrates logical values of various signals received or generated by the read-enabling window generation module of FIG. 3A.

FIG. 3A illustrates a read-enabling window generation module 300, according to an embodiment of the present disclosure, for a dual data rate (DDR) multi-rank memory system. The read-enabling window generation module 300 includes processing circuitry configured to, after the memory controller issues a read command, automatically detect a preamble and post-amble of the output of a memory rank and to trigger opening and closing of the read enabling window in response to detecting said preamble and post-amble. FIG. 3B illustrates logical values of various signals either received or generated by the read-enabling window generation module 300 and/or components thereof.

The read enabling window generation module 300 includes a preamble detection circuit 301 that includes a first input configured to receive a data strobe signal output by a memory rank of the multi-rank memory system. In the read enabling window generation module 300, the first input is configured to receive a true component dqs_t of a differential data strobe signal. The read enabling window generation module 300 further includes a termination. In the read enabling window generation module 300, the termination is a power termination. In addition, the read enabling window generation module 300 includes a comparator circuit 302 configured to receive the true component dqs_t of a differential data strobe signal and the reference signal vref, to perform one or more logical operations configured to detect the read cycle preamble, and to provide, at an output of the preamble detection circuit, a result of the one or more logical operations. In the read enabling window generation module 300, the circuit 302 is a comparator. The comparator is configured to compare the true component dqs_t to a reference signal vref and output "1" when dqs_t is high (i.e. exceeds vref) and "0" when dqs_t is low (i.e. as occurs when a read cycle preamble is provided by a memory rank). The comparator is further configured to provide, as an output dqs_buffered of the preamble detection circuit 301, a result of one or more logical operations configured to detect the read cycle preamble.

FIG. 3C illustrates a power termination suitable for use in the preamble detection circuit 301. In FIG. 3C, a dynamic random access memory (DRAM) forming all or a part of a memory rank of a multi-rank memory system outputs a differential data strobe signal, comprising a true component dqs_t and a complement component dqs_c, that is received by a memory controller. The differential data strobe signal is received via the power termination. The power termination determines the voltage level input to the internal circuitry of the memory controller during idle periods in which no signal is supplied from the DRAM.

The read enabling window generation module 300 further includes a first flip-flop 303 and a second flip flop 304. The first flip-flop 303 is a D flip-flop with reset and includes an input, a clock input, an output, and a reset. The input of the first flip-flop 303 is connected to a high voltage such that the input of the first flip-flop is always "1." The output, i.e. "dqs_buffered," of preamble detection circuit 301 is negated at the clock input of the first flip-flop such that the first flip-flop captures the value at its input (i.e. "1") in response to the preamble detection circuit 301 detecting the read cycle preamble. The output of the first flip flop, i.e. "read_en", therefore becomes "1" in response to the detection of the read cycle preamble by the preamble detection circuit 301 and the first flip-flop 303 outputs a trigger (i.e. a rising edge of the read_en signal) for opening the read enabling window.

The second flip-flop 304 is a D flip-flop and includes an input, a clock input, and an output. The input of the second flip-flop 304 is connected to the output of the preamble detection circuit, i.e. dqs_buffered, and the output of the preamble detection circuit is delayed, via a delay 305, and negated at the clock input of the second flip-flop 304 such that the clock input receives a delayed output of the pre-amble detection circuit, i.e. dqs_delayed. The delay provides a delay of 1 unit interval plus setup time. FIG. 3D illustrates a voltage controlled delay line, in the form of a simple inverter chain with delay control, which is suitable for use as the delay 305. Therefore, the processing circuitry of the read enabling window generation module 300 causes the second flip-flop 304 to capture the value of the preamble detection circuit output, i.e. dqs_buffered, at each falling edge of the dqs_delayed signal. In other words, the second flip-flop 304 samples the non-delayed output dqs_buffered of the preamble detection circuit 301 with the falling edge of the dqs_delayed signal to generate an en_delayed signal.

The read enabling window generation module 300 additionally includes a logic circuit configured to provide, as output, a result of one or more logical operations configured to detect the read cycle post-amble. In the embodiment illustrated in FIG. 3A, the logic circuit 306 is configured to detect the read cycle post-amble indirectly, i.e. from signals generated by processing the differential data strobe signal (i.e. dqs_t and dqs_c) output by a memory rank as opposed to directly from the differential data strobe signal itself. In the embodiment illustrated in FIG. 3A, the logic circuit 306 is a single logic gate in the form of a NOR gate. A first input of the NOR gate is connected to the output of the second flip-flop 304, a second input of the NOR gate is connected to, via a delay 307, to the output of the second flip-flop, and an output of the NOR gate is connected to the reset of the first flip-flop 303. In this manner, the second logic circuit 306, i.e. the NOR gate, is configured to provide, as an output rst, a result of one or more logical operations configured to detect the read cycle post-amble.

In the read enabling window generation module 300, the NOR gate is configured to generate a reset pulse in response to a falling edge in the output of the second flip-flop 304, i.e. en_delayed, which corresponds to a read cycle post-amble. The delay 307, which can be formed from an odd number of inverters, determines a width of the reset pulse. In this manner, the processing circuitry of the read enabling window generation module 300 causes the first flip-flop 303 to, in response to the detection of a read cycle post-amble, reset and thereby output a trigger (i.e. a falling edge of the read_en signal) for closing the read enabling window.

FIG. 3B illustrates, for the read enabling window generation module 300, logical values, with respect to time, of (i) the differential data strobe signal (i.e. dqs_t and dqs_c), (ii) dqs_buffered, (iii) dqs_delayed, (iv) en_delayed, (v) rst, and (vi) read_en. When the true component dqs_t of the differential data strobe signal drops to "0" (signifying a read cycle preamble), the output dqs_buffered of the preamble detection circuit 301 drops to "0" and the output of the first flip-flop 303 read_en becomes "1," thereby triggering an opening of the read enabling window. When the output dqs_buffered of the preamble detection circuit 301 becomes, for the first time following a setup period, equal to "0" for longer than a unit interval of the differential data strobe signal (signifying a read cycle post-amble), the output of the second flip-flop 304 drops from "1" to "0," a reset pulse is generated in the output of the second logic circuit 306, and the output of the first flip-flop 303 read_en drops to "0," thereby triggering a closing of the read enabling window.

Figure 3E:
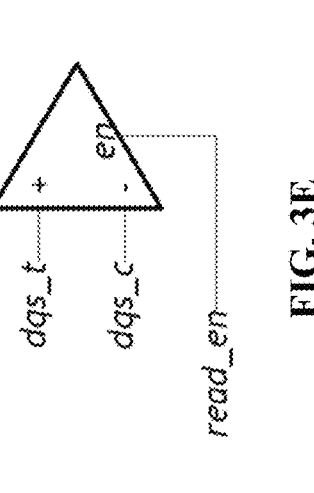
FIG. 3E illustrates the use of an output of the read-enabling window generation module of FIG. 3A to trigger opening and closing of a read enabling window for a memory controller.

FIG. 3E illustrates the use of the read_en signal with a differential receiver configured to receive a differential data strobe signal with components dqs_t and dqs_c, such that the read_en signal triggers opening and closing of a read enabling window for a memory controller.

FIG. 3F is a process flow diagram illustrating a method for self-generating a read-enabling window of a memory controller for a dual data rate (DDR) multi-rank memory system. At 321, the method includes applying power termination to detect a read cycle preamble by a preamble detection circuit. At 322, the method includes automatically opening a read enabling window in response to detecting the read cycle preamble. At 323, the method includes providing a delayed preamble detection circuit output. At 324, the method includes sampling a non-delayed preamble detection circuit output based on the delayed preamble detection circuit output to generate a read cycle post-amble detection signal. At 325, the method includes detecting a value change in the read cycle post-amble detection signal thereby indicating detection of a read cycle post-amble. At 326, the method includes automatically closing the read enabling window in response to detecting the read cycle post-amble.

Figures 3G, 3I:
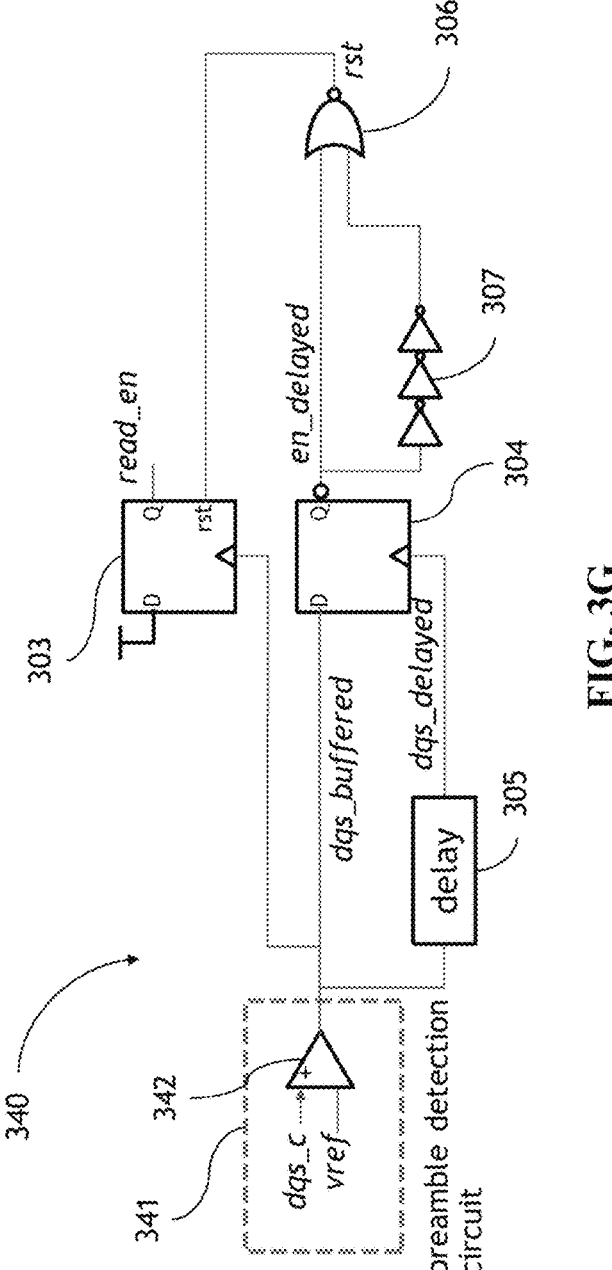
FIG. 3G illustrates a read-enabling window generation module for a low-power dual data rate (LPDDR) multi-rank memory system.
FIG. 3I illustrates a ground termination interface suitable for use in a preamble detection circuit of the read-enabling window generation module of FIG. 3G.
Figure 3H:
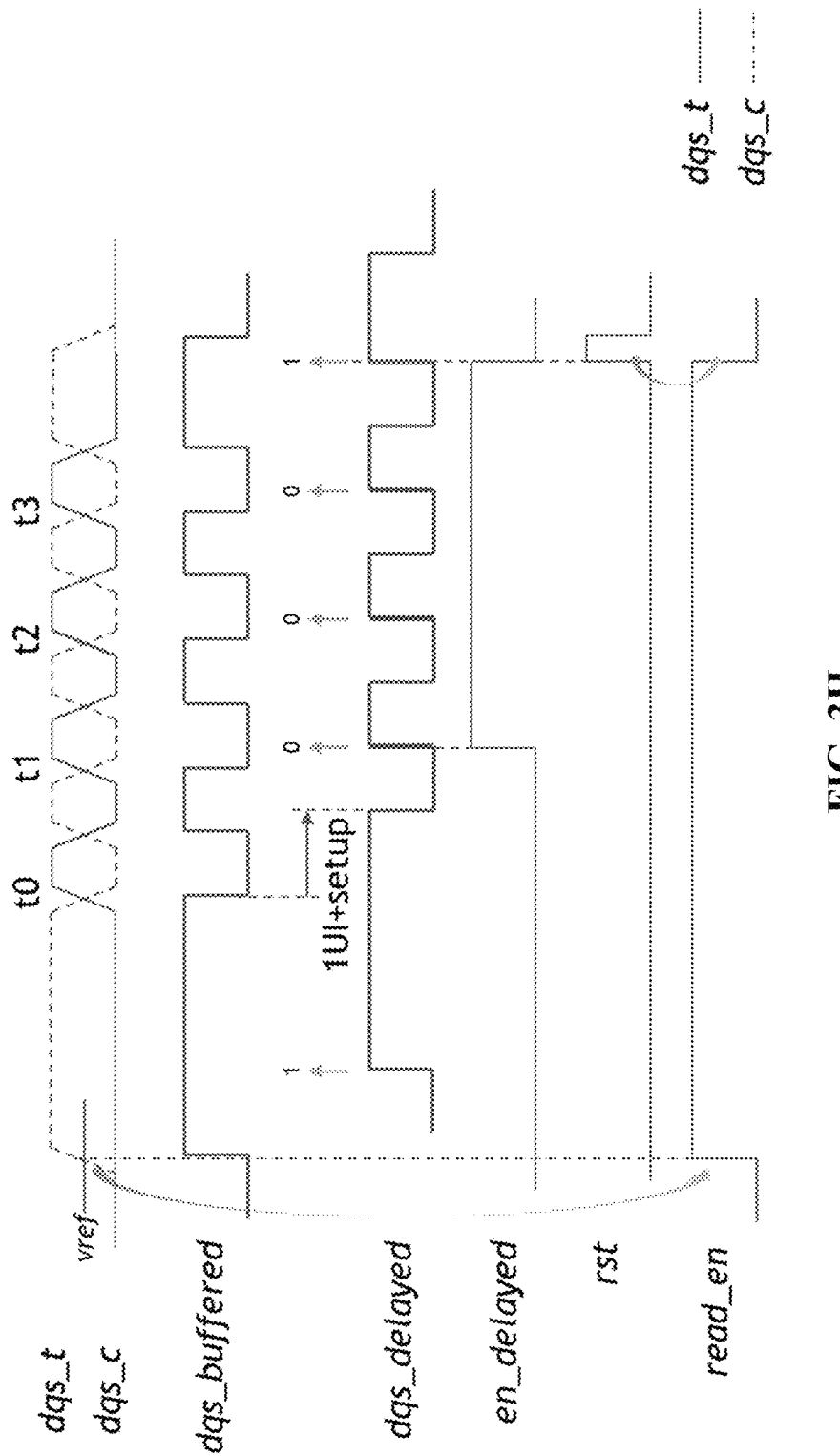
FIG. 3H illustrates logical values of various signals received or generated by the read-enabling window generation module of FIG. 3G.

FIG. 3G illustrates a read-enabling window generation module 340, according to an embodiment of the present disclosure, for a low-power dual data rate (LPDDR) multi-rank memory system. The read-enabling window generation module 340 includes processing circuitry configured to, after the memory controller issues a read command, automatically detect a preamble and post-amble of the output of a memory rank and to trigger opening and closing of the read enabling window in response to detecting said preamble and post-amble. FIG. 3H illustrates logical values of various signals either received or generated by the read-enabling window generation module 340 and/or components thereof.

The read enabling window generation module 340 includes a preamble detection circuit 341 that includes a first input configured to receive a data strobe signal output by a memory rank of the multi-rank memory system. In the read enabling window generation module 340, the first input is configured to receive a complement component dqs_c of a differential data strobe signal. The read enabling window generation module 340 further includes a termination. In the read enabling window generation module 340, the termination is a ground termination. In addition, the read enabling window generation module 340 includes a comparator circuit 342 configured to receive the complement component dqs_c of the differential data strobe signal and a reference signal vref, to perform one or more operations configured to detect the read cycle preamble, and to provide, at an output of the preamble detection circuit, a result of the one or more operations. In the read enabling window generation module 340, the circuit 342 is a comparator. The comparator is configured to compare the complement component dqs_c to the reference signal vref and output "0" when dqs_c is low and "1" when dqs_c is high (i.e. as occurs when a read cycle preamble is provided by a memory rank). The comparator is further configured to provide, as an output dqs_buffered of the preamble detection circuit 341, a result of one or more operations configured to detect the read cycle preamble. Apart from not negating the output of the preamble detection circuit at the inputs of the first and second flip-flops 303, 304 and negating the output of the second flip-flop 304, the read enabling window generation module 340 is otherwise configured in an identical manner to the read enabling window generation module 300, and identical reference numerals correspond to identical components.

FIG. 3I illustrates a ground termination suitable for use in the preamble detection circuit 341. In FIG. 3I, a dynamic random access memory (DRAM) forming all or a part of a memory rank of a multi-rank memory system outputs a differential data strobe signal, comprising a true component dqs_t and a complement component dqs_c, that is received by a memory controller. The differential data strobe signal is received via the ground termination. The ground termination determines the voltage level input to the internal circuitry of the memory controller during idle periods in which no signal is supplied from the DRAM.

FIG. 3H illustrates, for the read enabling window generation module 340, logical values, with respect to time, of (i) the differential data strobe signal (i.e. dqs_t and dqs_c), (ii) dqs_buffered, (iii) dqs_delayed, (iv) en_delayed, (v) rst, and (vi) read_en. When the complement component dqs_c of the differential data strobe signal rises to "1" (signifying a read cycle preamble), the output dqs_buffered of the preamble detection circuit 341 and the output of the first flip-flop 303 read_en both become "1," thereby triggering an opening of the read enabling window. When the output dqs_buffered of the preamble detection circuit 341 becomes, for the first time following a setup period, equal to "1" for longer than a unit interval of the differential data strobe signal (signifying a read cycle post-amble), the output of the second flip-flop 304 drops from "1" to "0," a reset pulse is generated in the output of the second logic circuit 306, and the output of the first flip-flop 303 read_en drops to "0," thereby triggering a closing of the read enabling window.

FIG. 3J is a process flow diagram illustrating a method for self-generating a read-enabling window of a memory controller for a low power dual data rate (LPDDR) multi-rank memory system. At 361, the method includes applying ground termination to detect a read cycle preamble by a preamble detection circuit. At 362, the method includes automatically opening a read enabling window in response to detecting the read cycle preamble. At 363, the method includes providing a delayed preamble detection circuit output. At 364, the method includes sampling a non-delayed preamble detection circuit output based on the delayed preamble detection circuit output to generate a read cycle post-amble detection signal. At 365, the method includes detecting a value change in the read cycle post-amble detection signal thereby indicating detection of a read cycle post-amble. At 366, the method includes automatically closing the read enabling window in response to detecting the read cycle post-amble.

Parallel Processing Architecture

Figure 4:
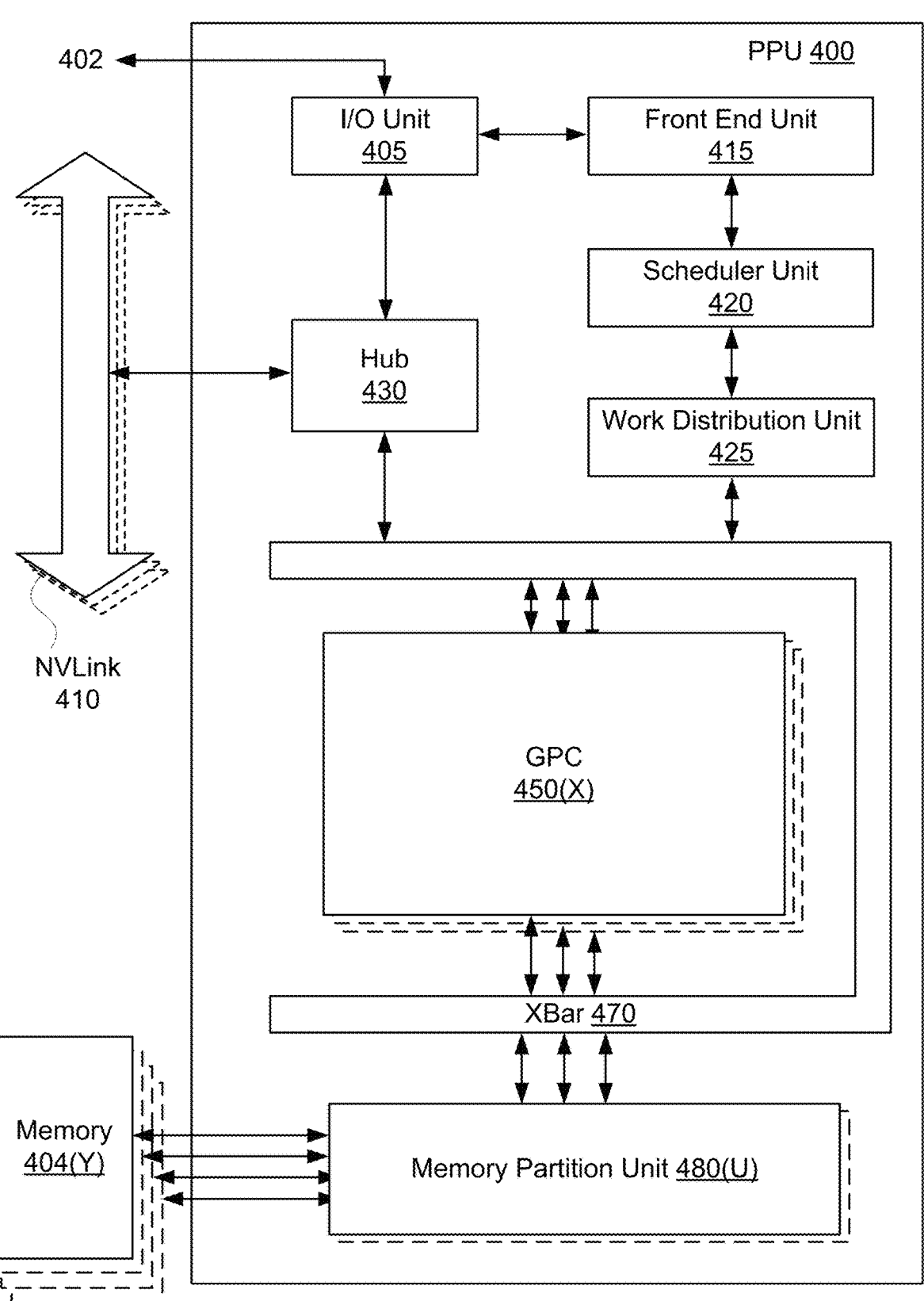
FIG. 4 illustrates an example parallel processing unit suitable for use with embodiments of the present disclosure.

The read-enabling window generation module according to the first aspect, the memory controller according to the second aspect, and the multi-rank memory system according to the third aspect can provide memory, and/or components thereof, for a parallel processing unit (PPU) as illustrated in FIG. 4.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth. The read-enabling window generation module according to the first aspect, the memory controller according to the second aspect, and the multi-rank memory system according to the third aspect can provide memory, and/or components thereof, for such systems with multiple GPUs and CPUs.

Figure 5A:
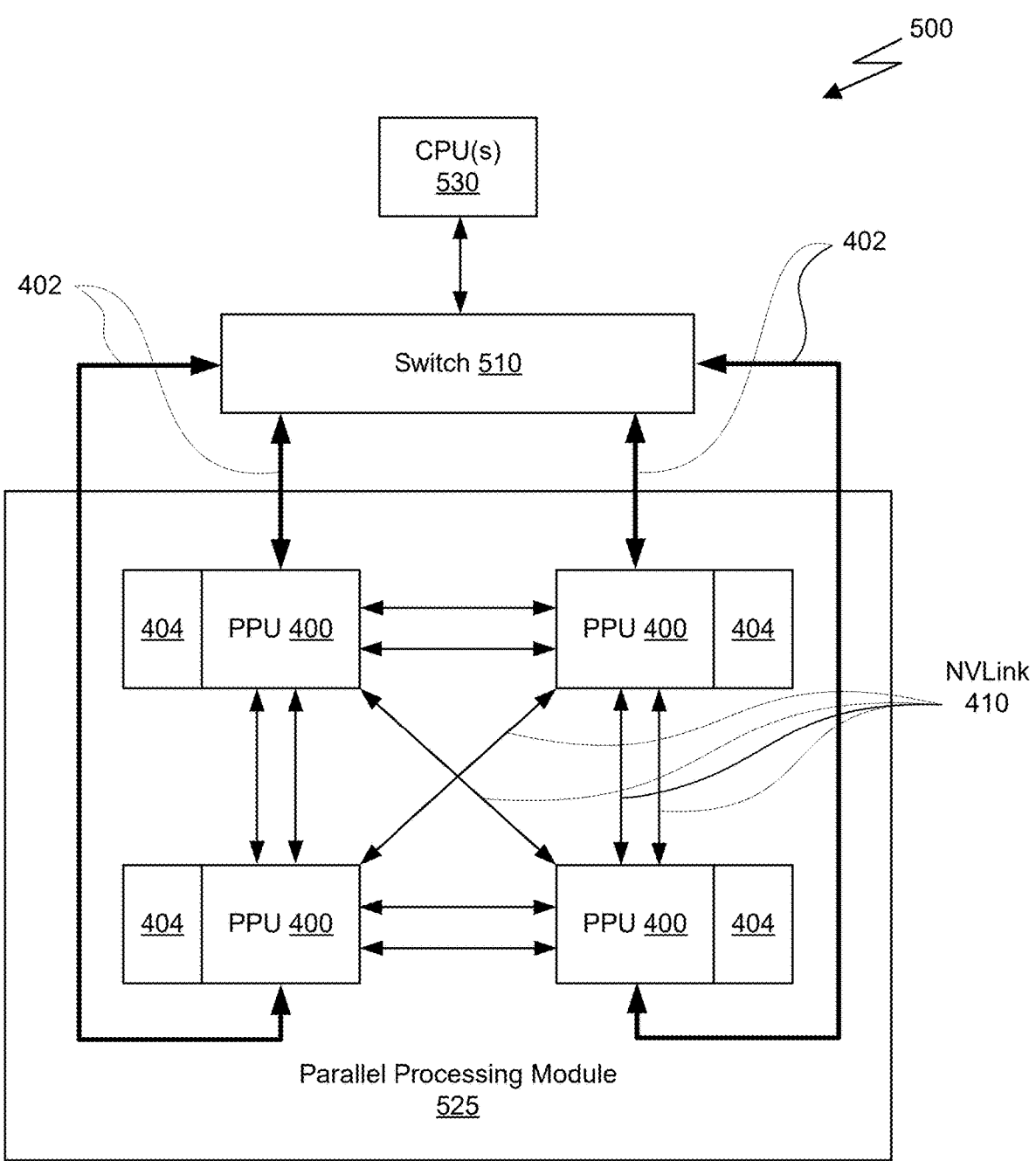
FIG. 5A is a conceptual diagram of a processing system implemented using the PPU of FIG. 4, suitable for use with embodiments of the present disclosure.

FIG. 5A is a conceptual diagram of a processing system 500 implemented using the PPU 400 of FIG. 4, in accordance with an embodiment. The processing system 500 includes a CPU 530, switch 510, and multiple PPUs 400, and respective memories 404.

Figure 5B:
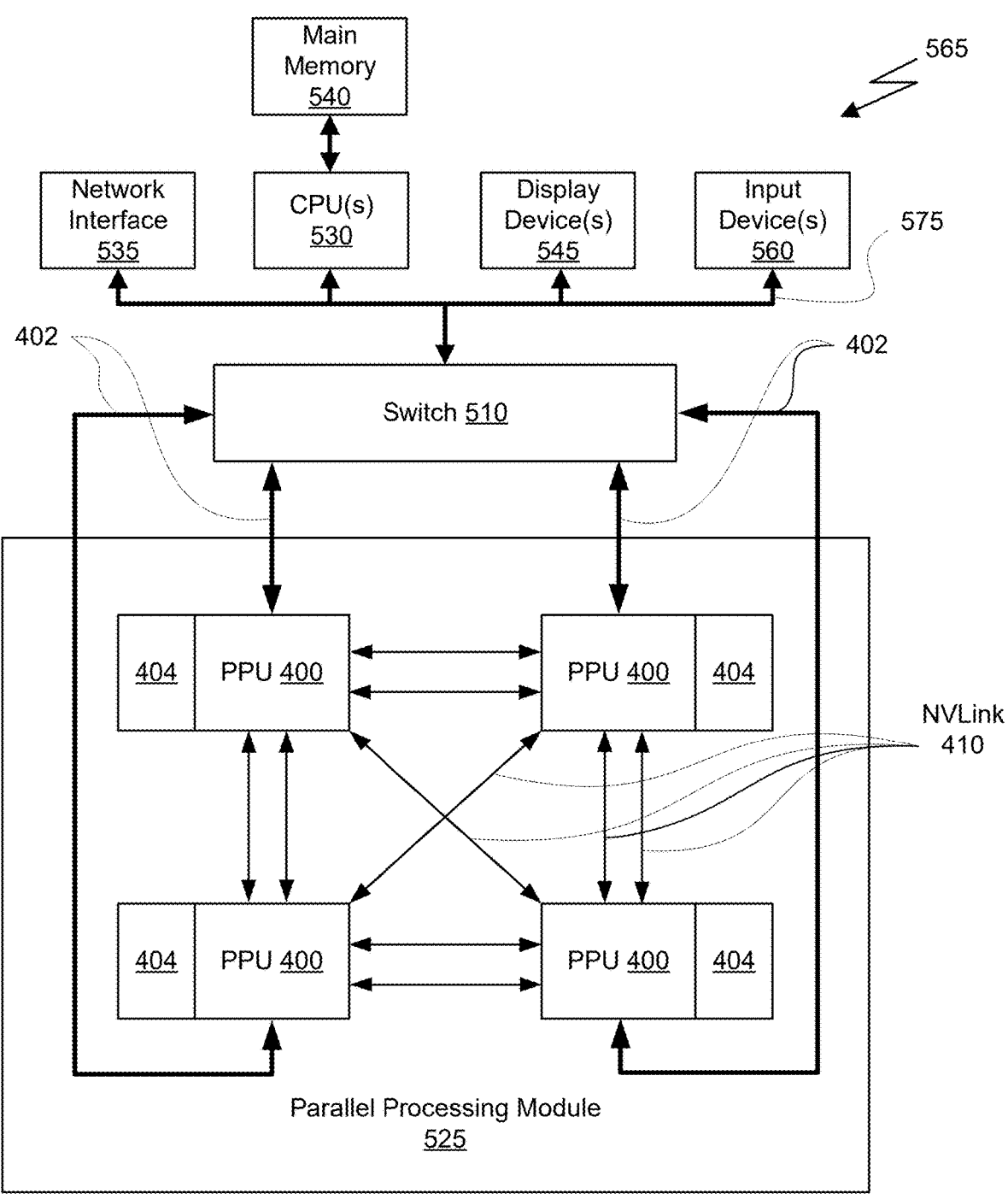
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Figure 5C:
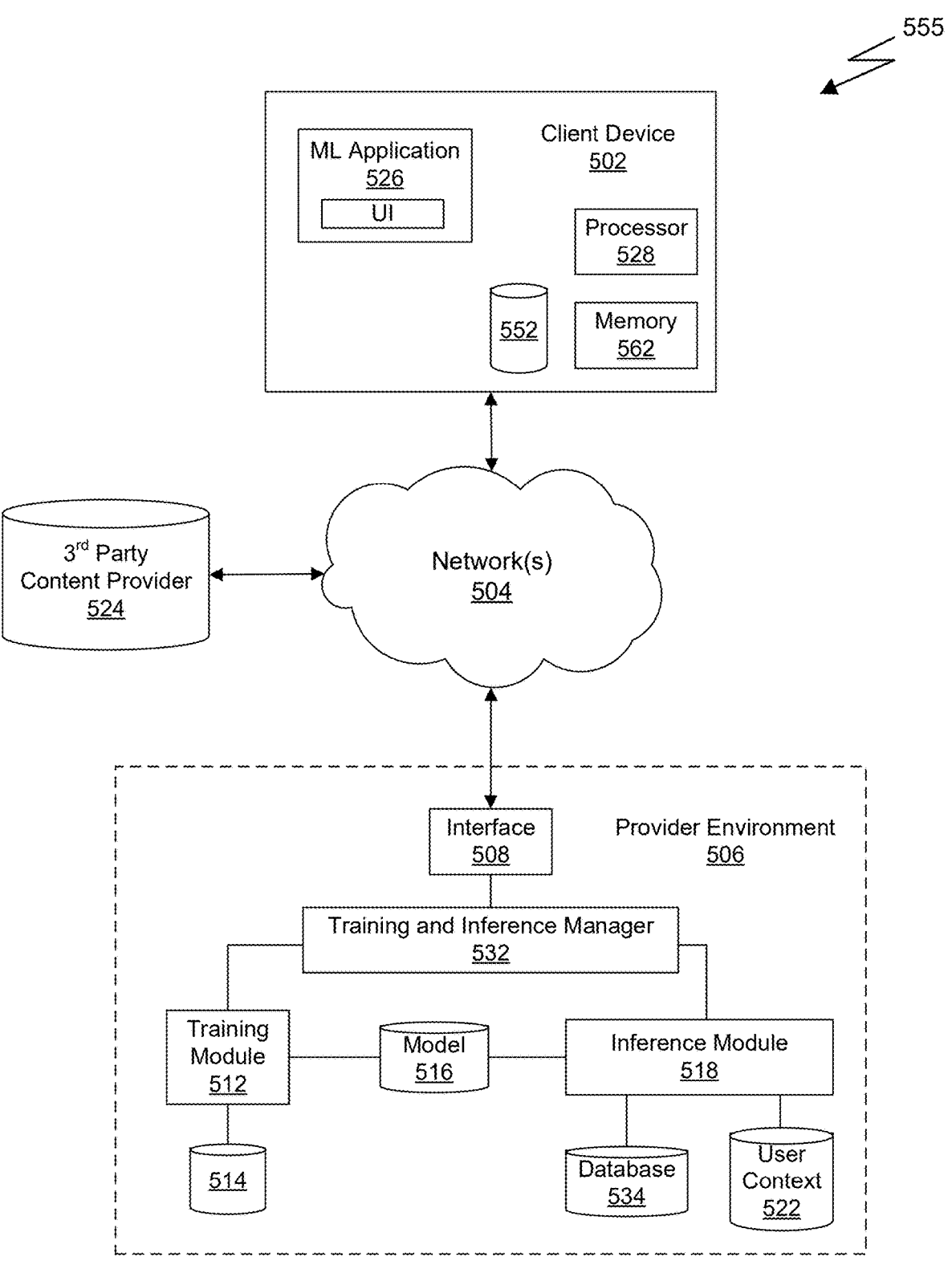
FIG. 5C illustrates components of an exemplary system that can be used to train and utilize machine learning.

Although the various blocks of FIG. 5C are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5C is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5C.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5B and/or exemplary system 555 of FIG. 5C. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 300 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In an embodiment, the set of training data may be used in a generative adversarial training configuration to train a generator neural network.

In at least one embodiment, training data can include images of at least one human subject, avatar, or character for which a neural network is to be trained. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Example Game Streaming System

Figure 6:
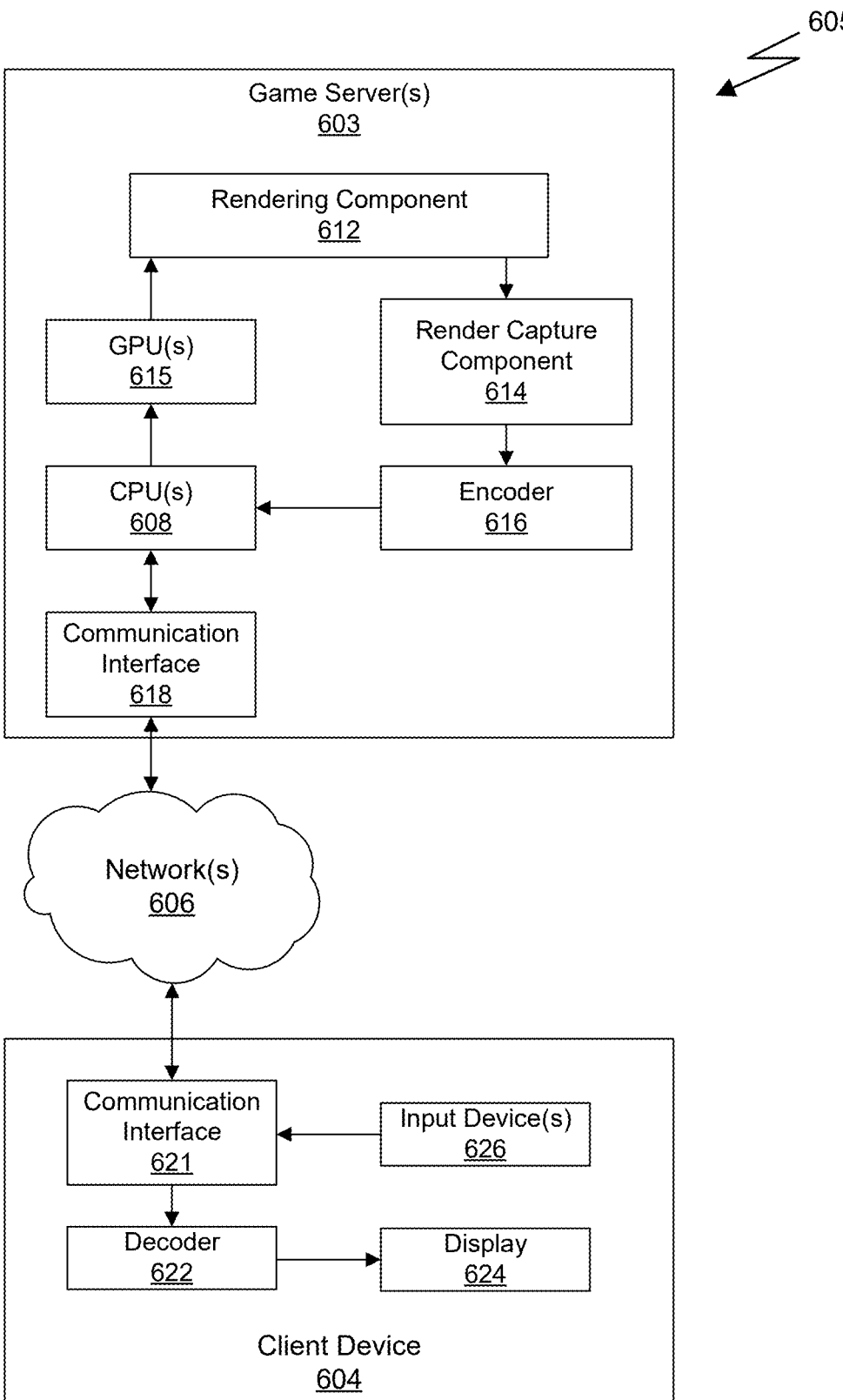
FIG. 6 illustrates an exemplary game streaming system suitable for use with some embodiments of the present disclosure.

FIG. 6 is an example system diagram for a game streaming system 605, in accordance with some embodiments of the present disclosure. FIG. 6 includes game server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In the system 605, for a game session, the client device(s) 604 may only receive input data in response to inputs to the input device(s), transmit the input data to the game server(s) 603, receive encoded display data from the game server(s) 603, and display the display data on the display 624. As such, the more computationally intense computing and processing is offloaded to the game server(s) 603 (e.g., rendering—in particular ray or path tracing—for graphical output of the game session is executed by the GPU(s) of the game server(s) 603). In other words, the game session is streamed to the client device(s) 604 from the game server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the game server(s) 603. The client device 604 may receive an input to one of the input device(s) and generate input data in response. The client device 604 may transmit the input data to the game server(s) 603 via the communication interface 621 and over the network(s) 606 (e.g., the Internet), and the game server(s) 603 may receive the input data via the communication interface 618. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the game server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A read-enabling window generation module for a memory controller of a multi-rank memory system, the read-enabling window generation module being configured to trigger the generation of a read enabling window, the read-enabling window generation module comprising:

processing circuitry configured to:

detect, from a data strobe signal received from a respective memory rank of the multi-rank memory system, a read cycle preamble that precedes a transmission of data from the respective memory rank to the memory controller during a read cycle, output, in response to detecting the read cycle preamble, a trigger for opening the read enabling window, detect, from the data strobe signal received from the respective memory rank, a read cycle post-amble that follows the transmission of data from the respective memory rank to the memory controller during the read cycle, and output, in response to detecting the read cycle post-amble, a trigger for closing the read enabling window, wherein the processing circuitry comprises a preamble detection circuit, the preamble detection circuit being configured to detect the read cycle preamble and utilize a termination to receive the data strobe signal, the termination being a power termination or a ground termination.

2. The read-enabling window generation module according to claim 1, the preamble detection circuit comprising:

an input configured to receive the data strobe signal from the respective memory rank via a shared physical channel that connects a plurality of memory ranks of the multi-rank memory system to the memory controller, the termination, and a comparator circuit configured to:

process the data strobe signal and a reference signal, and provide, at an output of the preamble detection circuit, a result of one or more operations for detecting the read cycle preamble.

3. The read-enabling window generation module according to claim 2, wherein the termination is an on-die termination of the memory controller.

4. A memory controller for a multi-rank memory system, the memory controller comprising:

the read-enabling window generation module according to claim 3.

5. The read-enabling window generation module according to claim 2, wherein the processing circuitry further comprises a logic circuit configured to provide, as output, a result of one or more logical operations configured to detect the read cycle post-amble.

6. The read-enabling window generation module according to claim 5, wherein the processing circuitry further comprises a first flip flop, the first flip-flop comprising a clock input and an output, wherein the clock input of the first flip-flop is connected to the output of the preamble detection circuit, and wherein the output of the first flip-flop is configured to:

output the trigger for opening the read enabling window in response to the output of the preamble detection circuit indicating that the read cycle preamble has been detected, and output the trigger for closing the read enabling window in response to the output of the logic circuit indicating that the read cycle post-amble has been detected.

7. The read-enabling window generation module according to claim 6, wherein the processing circuitry further comprises a second flip flop, the second flip-flop comprising an input connected to the output of the preamble detection circuit, a clock input connected, via a delay, to the output of the preamble detection circuit, and an output, and wherein the logic circuit comprises a first input connected to the output of the second flip flop, a second input connected, via a delay, to the output of the second flip flop, and an output connected to a reset of the first flip flop.

8. The read-enabling window generation module according to claim 2, wherein the multi-rank memory system is a dual data rate (DDR) memory system, the data strobe signal is a differential data strobe signal comprising a true component and a complement component, the termination is a power termination, and the comparator circuit comprises a comparator configured to compare a value of the true component to a value of the reference signal.

9. The read-enabling window generation module according to claim 2, wherein the multi-rank memory system is a low-power dual data rate (LPDDR) memory system, the data strobe signal is a differential data strobe signal comprising a true component and a complement component, the termination is a ground termination, and the comparator circuit comprises a comparator configured to compare a value of the complement component to a value of the reference signal.

10. A memory controller for a multi-rank memory system, the memory controller comprising the read-enabling window generation module according to claim 1.

11. A multi-rank memory system, the multi-rank memory system comprising:

a memory controller comprising the read-enabling window generation module according to claim 1;

a plurality of memory ranks; and a shared physical channel connecting the memory controller to the plurality of memory ranks.

12. A method for self-generating a read enabling window of a memory controller for a multi-rank memory system, the method comprising:

receiving a data strobe signal from a respective memory rank of the multi-rank memory system;

detecting, from the data strobe signal, a read cycle preamble that precedes a transmission of data from the respective memory rank to the memory controller during a read cycle, wherein the detecting the read cycle preamble comprises providing the data strobe signal to a preamble detection circuit configured to detect the read cycle preamble, wherein the preamble detection circuit is configured to utilize a termination to receive the data strobe signal, the termination being a power termination or a ground termination;

opening, in response to detecting the read cycle preamble, the read enabling window;

detecting, from the data strobe signal, a read cycle post-amble that follows the transmission of data from the respective memory rank to the memory controller during the read cycle; and closing, in response to detecting the read cycle post-amble, the read enabling window.

13. The method according to claim 12, wherein the preamble detection circuit is configured to perform, via a comparator circuit, one or more operations configured to detect the read cycle preamble.

14. The method according to claim 13, wherein the detecting the read cycle post-amble comprises performing, via a logic circuit, a logical operation configured to detect the read cycle post-amble.

15. The method according to claim 13, wherein the multi-rank memory system is a dual data rate (DDR) memory system, the data strobe signal is a differential data strobe signal comprising a true component and a complement component, the preamble detection circuit is configured to utilize the power termination to receive the data strobe signal, and the comparator circuit comprises a comparator configured to compare the true component received via the termination to a reference signal.

16. The method according to claim 13, wherein the multi-rank memory system is a low power dual data rate (LPDDR) memory system, the data strobe signal is a differential data strobe signal comprising a true component and a complement component, the preamble detection circuit is configured to utilize the ground termination to receive the data strobe signal, and the comparator circuit comprises a comparator configured to compare the complement component received via the termination to a reference signal.

17. The method according to claim 12, wherein the opening, in response to detecting the read cycle preamble, the read enabling window is performed in response to a trigger, output by a first flip-flop, and wherein the closing, in response to detecting the read cycle post-amble, the read enabling window is performed in response to a trigger, output by the first flip flop.

18. The method according to claim 17, wherein the first flip-flop comprises:

a clock input connected to an output of the preamble detection circuit, a reset connected to an output of a logic circuit configured to perform a logical operation configured to detect the read cycle post-amble, and an output configured to output the trigger for opening the read-enabling window and to output the trigger for closing the read-enabling window.

* * * * *